Oct. 27, 1953   J. P. GRADY   2,656,658
BAGMAKING AND FILLING MACHINE
Filed Feb. 7, 1951   9 Sheets-Sheet 1
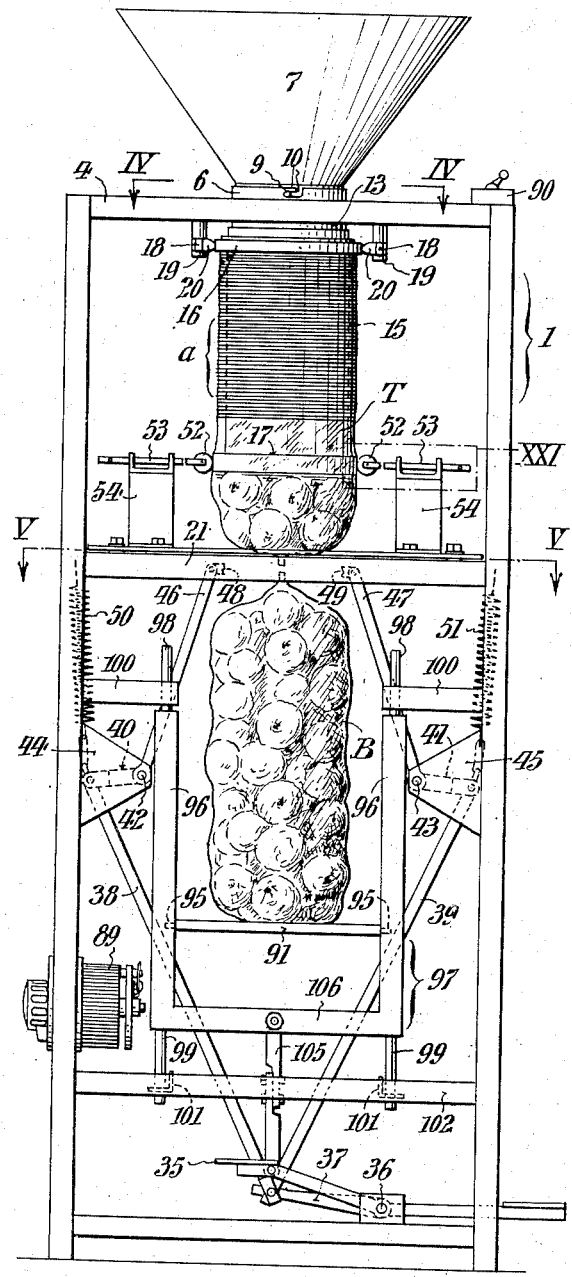
INVENTOR:
John P. Grady,
BY Paul & Paul
ATTORNEYS.

Oct. 27, 1953
J. P. GRADY
2,656,658
BAGMAKING AND FILLING MACHINE
Filed Feb. 7, 1951
9 Sheets-Sheet 2
FIG_4_
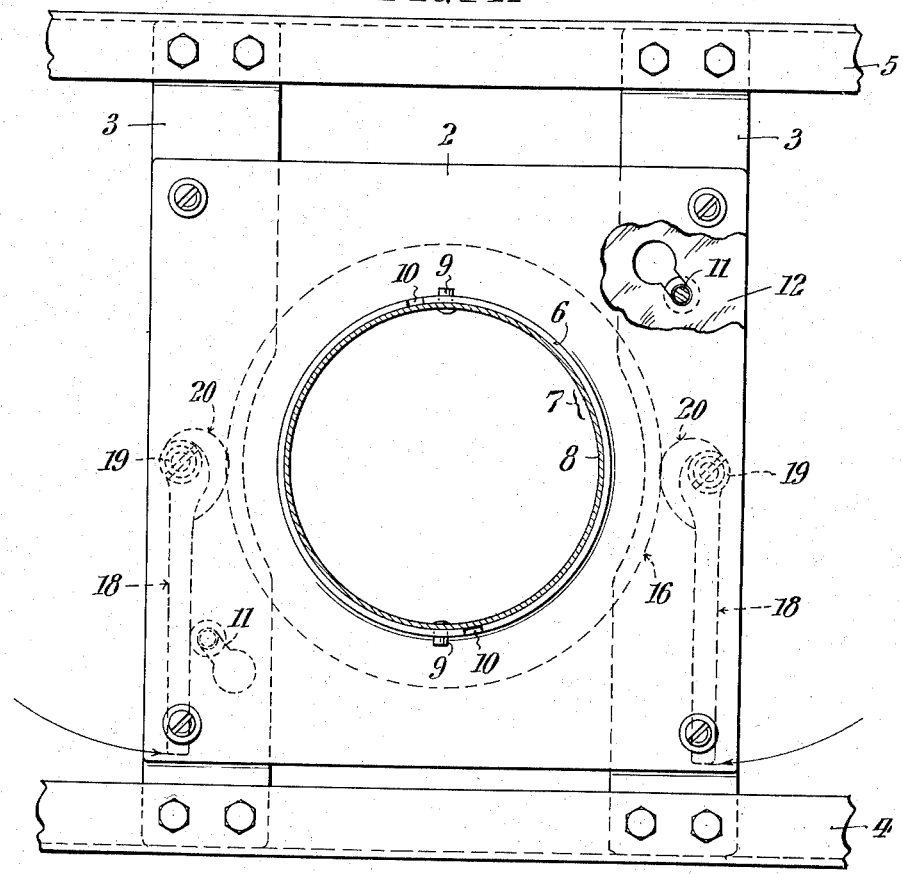
FIG_3_
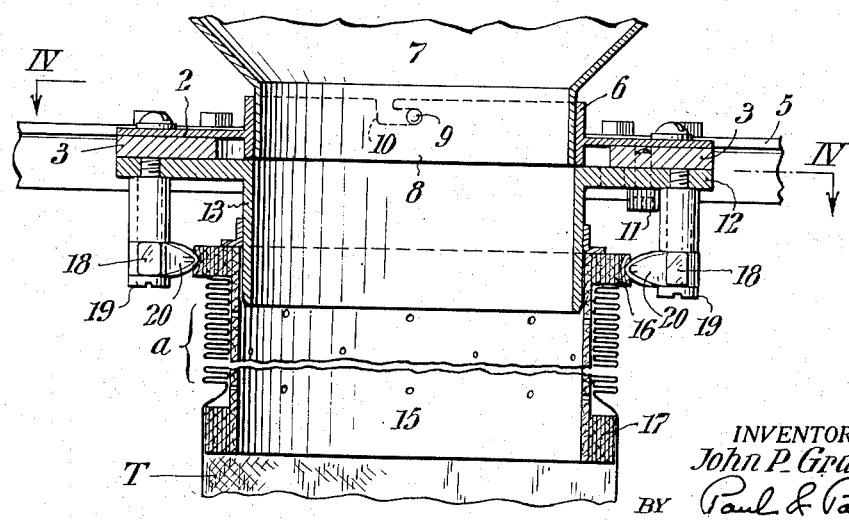
INVENTOR:
John P. Grady,
BY Paul & Paul
ATTORNEYS.

Oct. 27, 1953   J. P. GRADY   2,656,658
BAGMAKING AND FILLING MACHINE
Filed Feb. 7, 1951   9 Sheets-Sheet 3
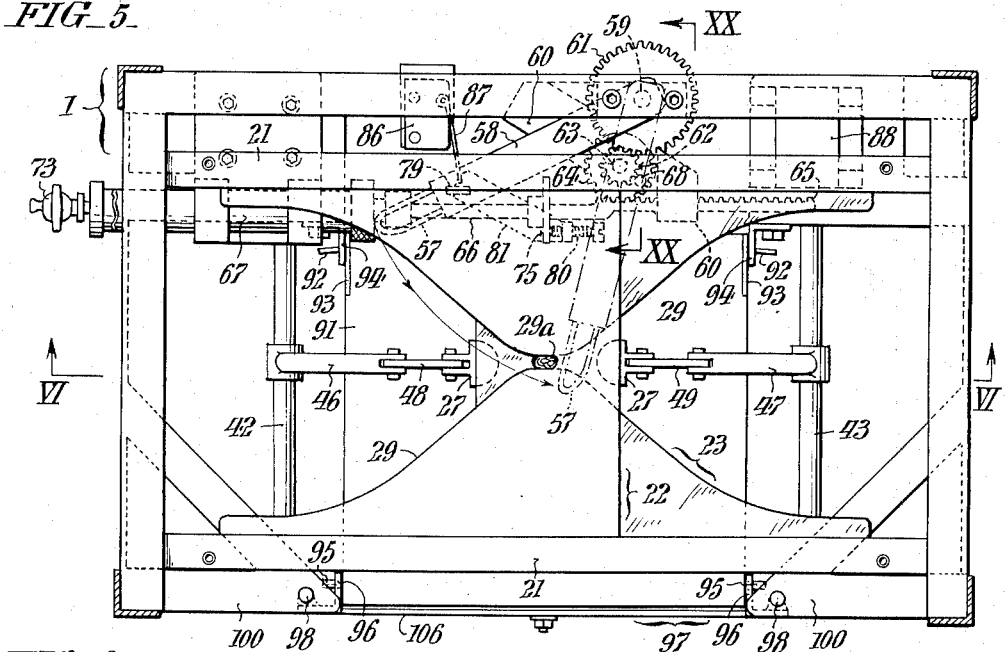
FIG. 5.
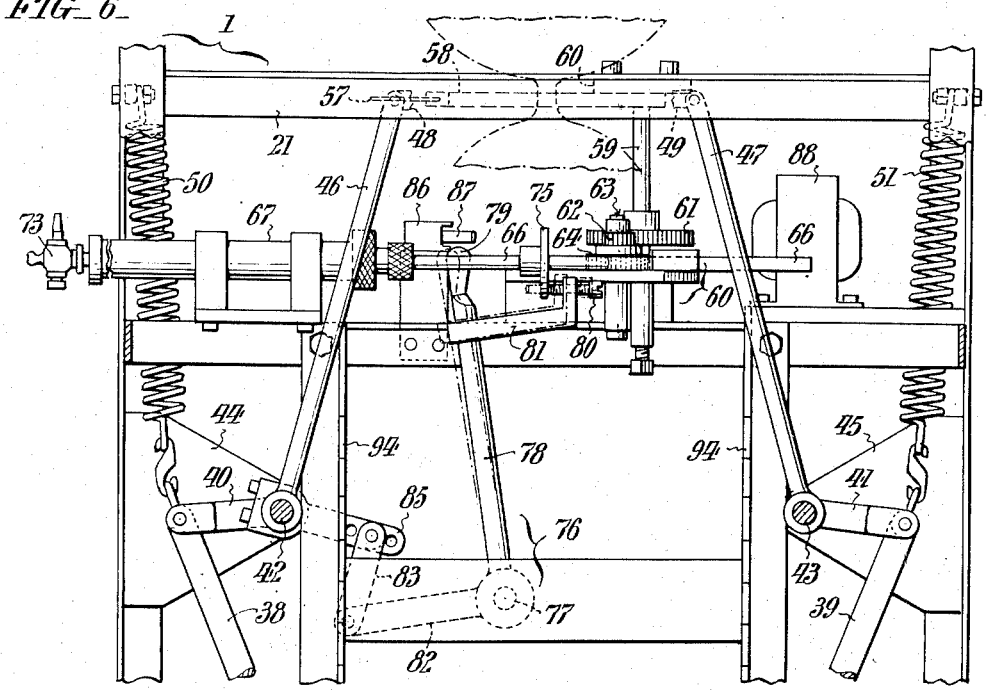
FIG. 6.
FIG. 22.
INVENTOR:
John P. Grady,
BY Paul & Paul
ATTORNEYS.

Oct. 27, 1953  J. P. GRADY  2,656,658
BAGMAKING AND FILLING MACHINE
Filed Feb. 7, 1951  9 Sheets-Sheet 4
FIG_7
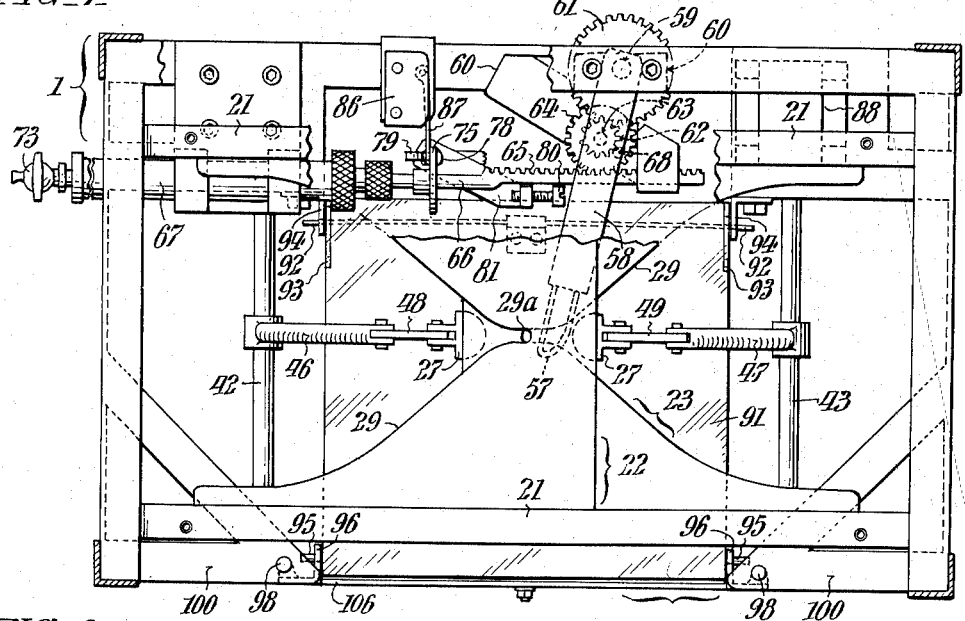
FIG_8
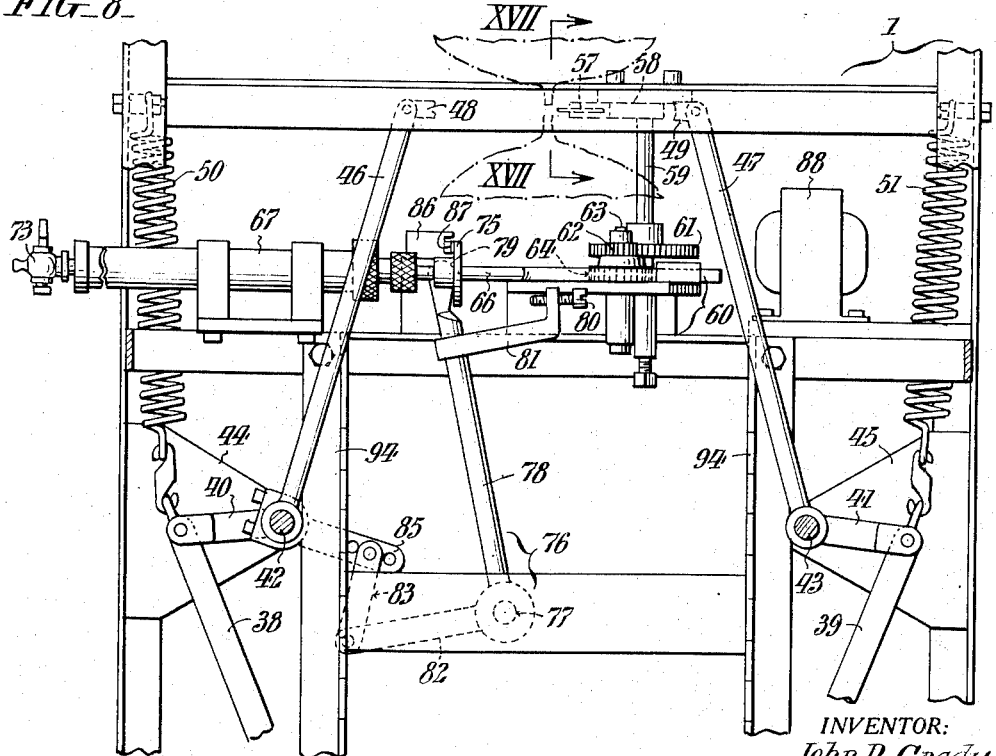
INVENTOR:
John P. Grady,
BY Paul & Paul
ATTORNEYS.

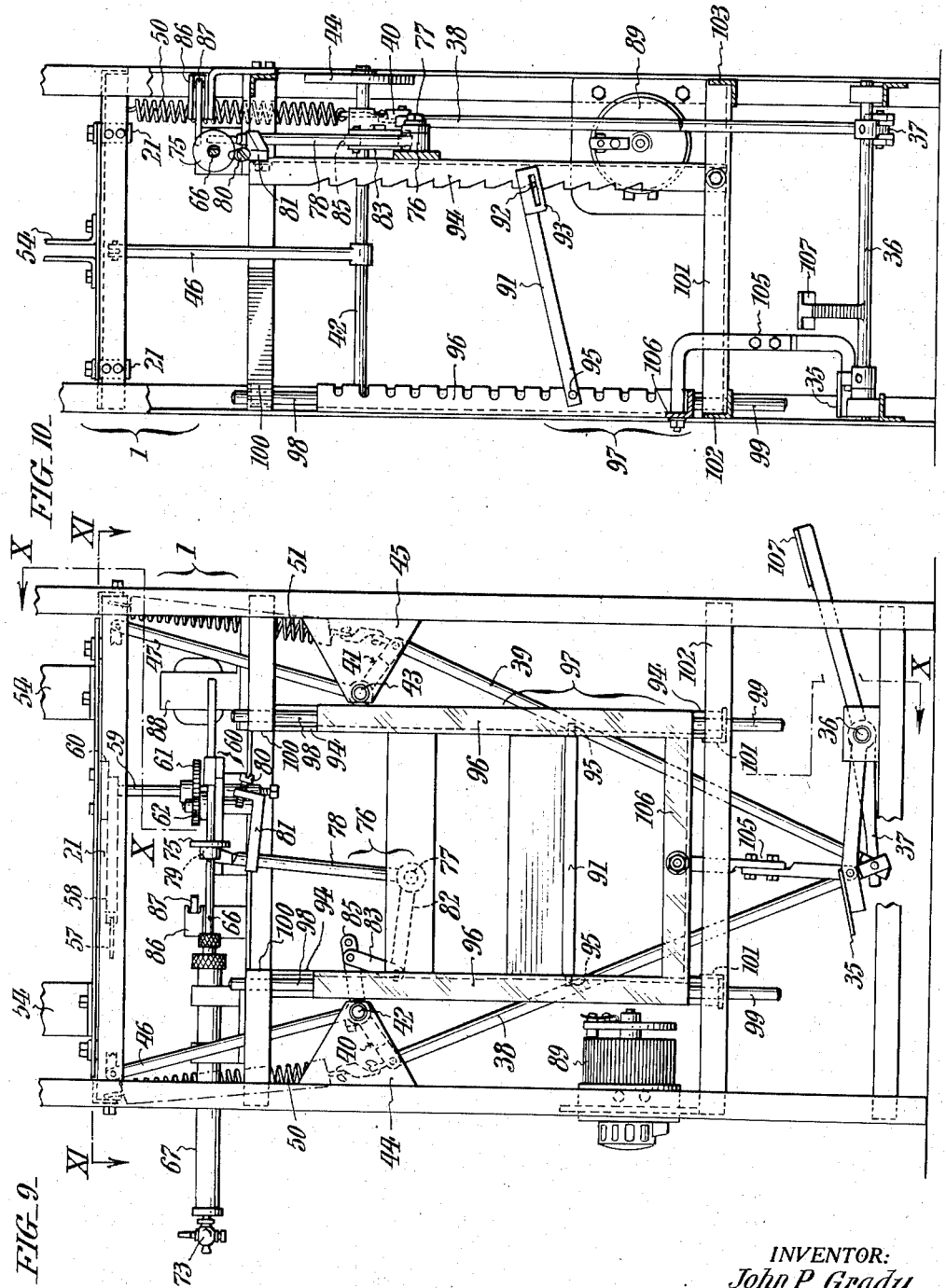

Oct. 27, 1953    J. P. GRADY    2,656,658
BAGMAKING AND FILLING MACHINE
Filed Feb. 7, 1951    9 Sheets-Sheet 6
FIG_11_
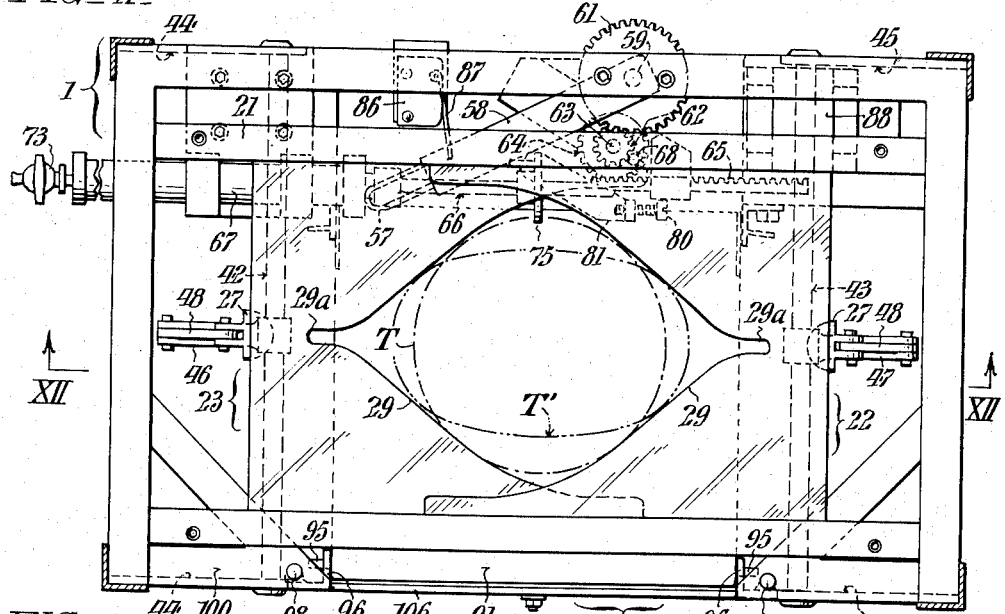
FIG_12_
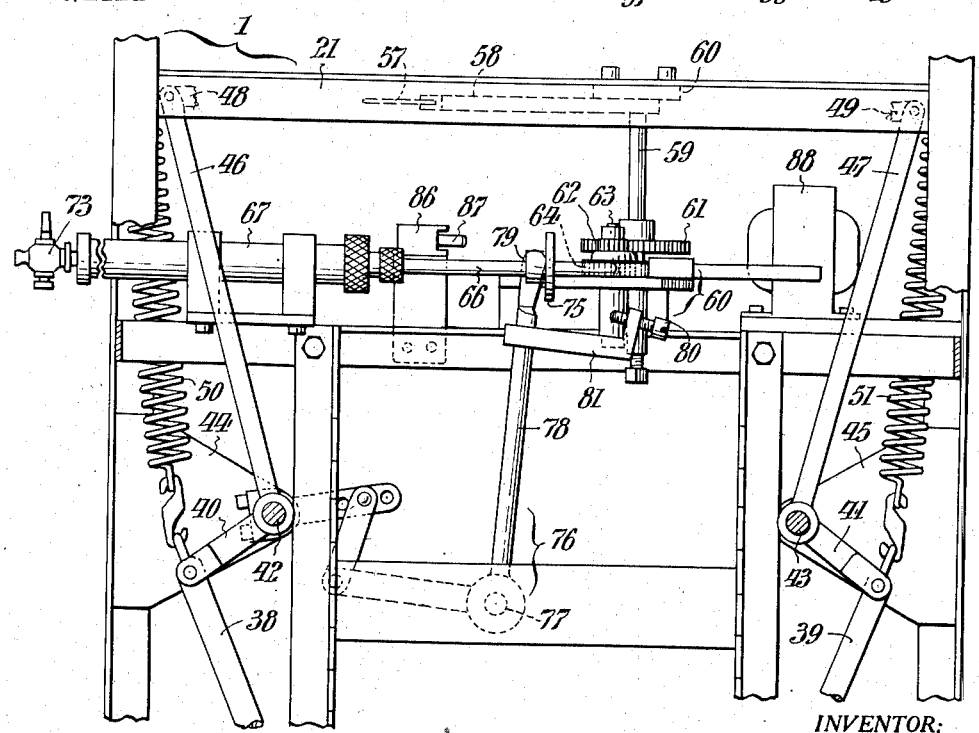
INVENTOR:
John P. Grady,
BY   Paul & Paul
ATTORNEYS.

Oct. 27, 1953  J. P. GRADY  2,656,658
BAGMAKING AND FILLING MACHINE
Filed Feb. 7, 1951  9 Sheets-Sheet 7
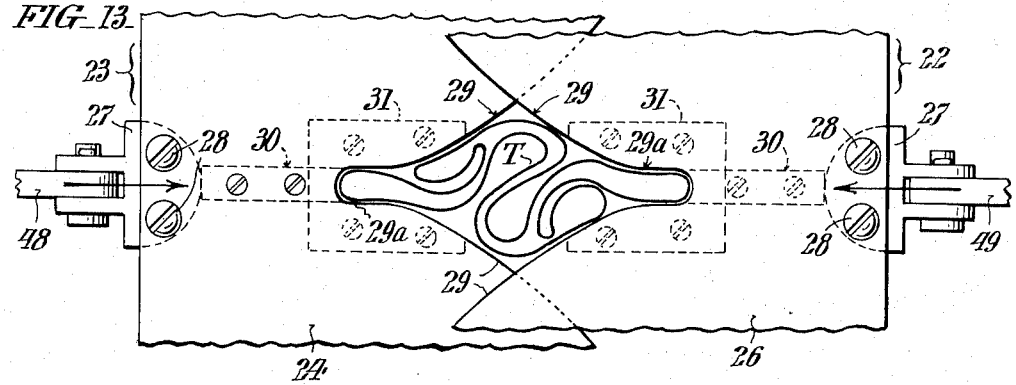
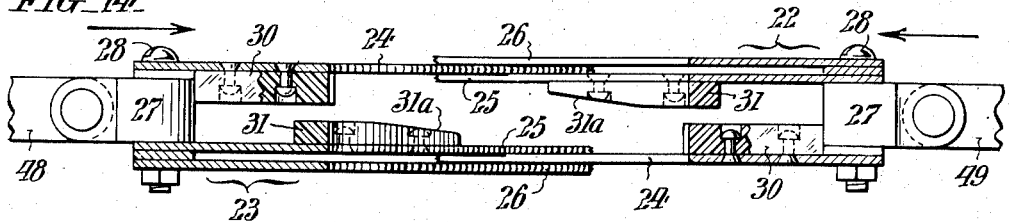
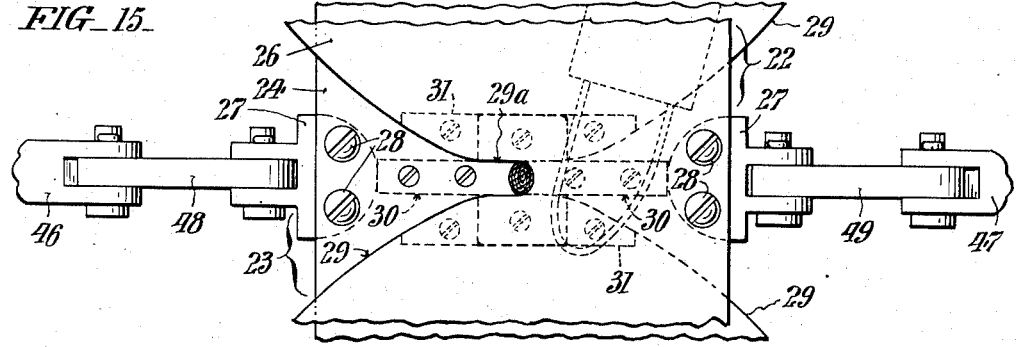
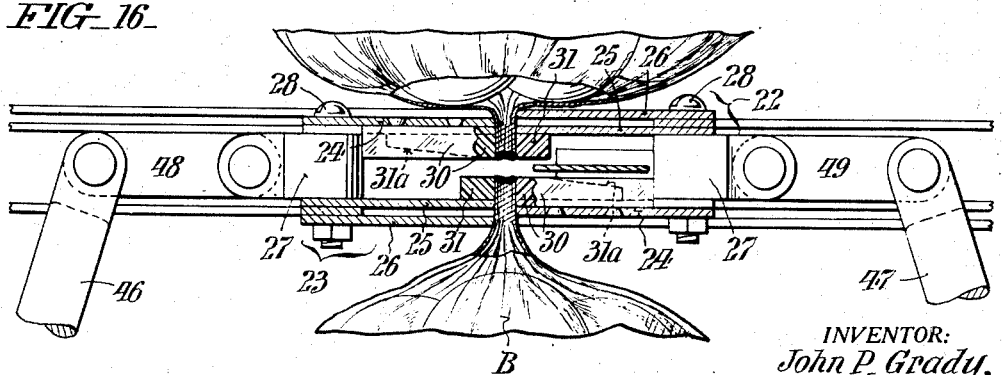
INVENTOR:
John P. Grady,
BY Paul & Paul
ATTORNEYS.

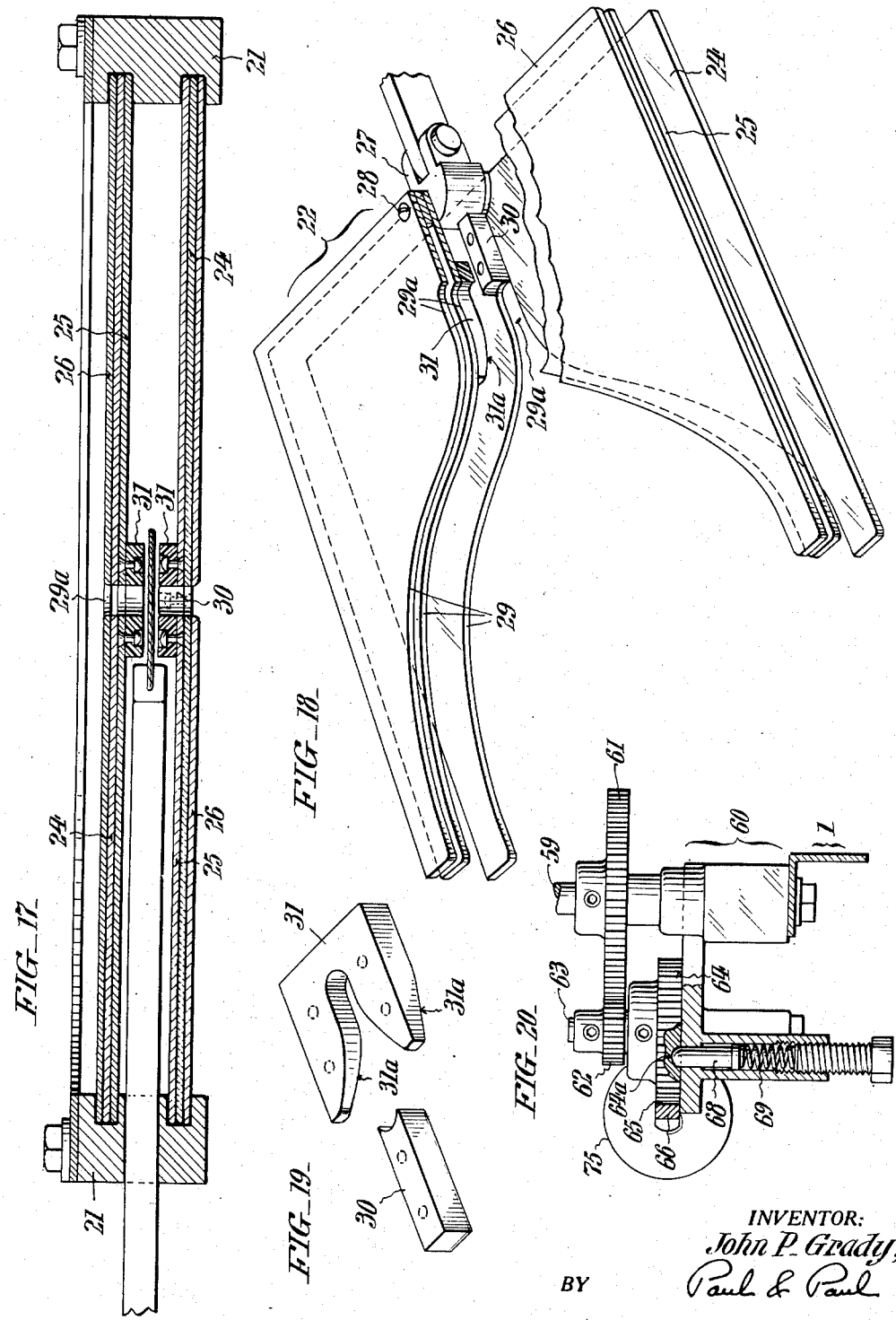

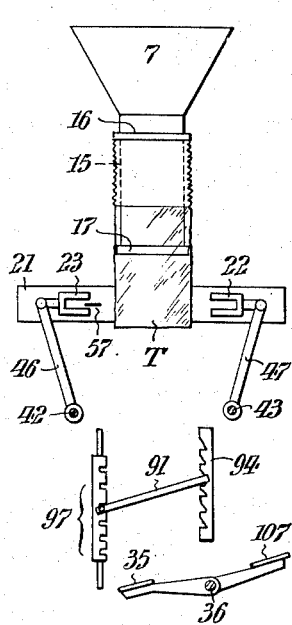
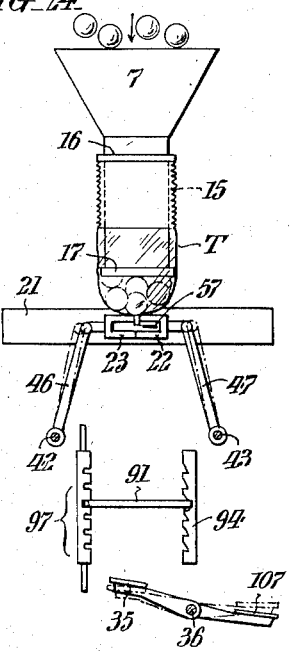
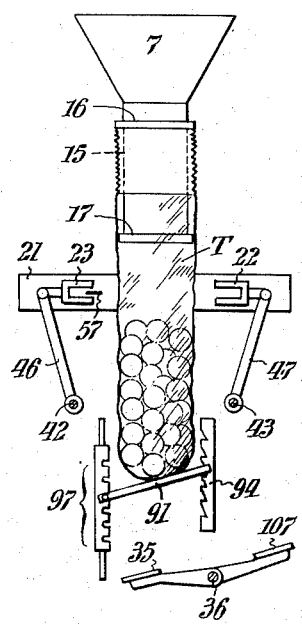
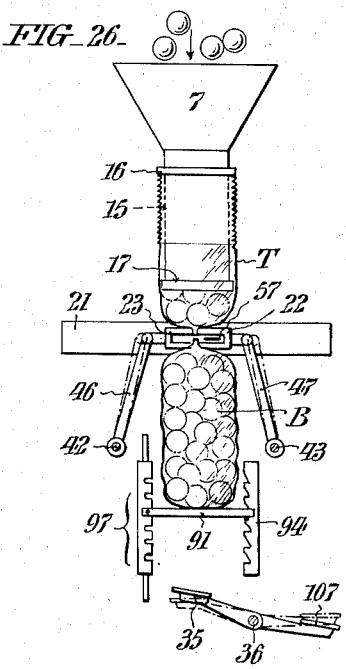
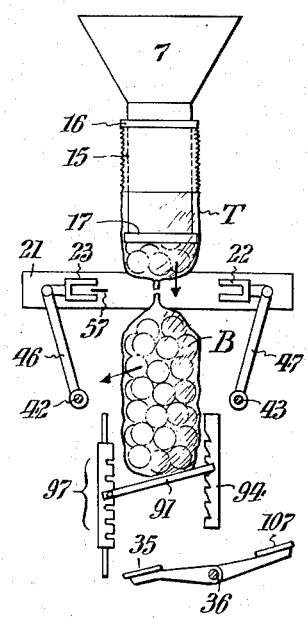

Patented Oct. 27, 1953

2,656,658

UNITED STATES PATENT OFFICE 2,656,658

BAGMAKING AND FILLING MACHINE

John P. Grady, Narberth, Pa.

Application February 7, 1951, Serial No. 209,813

16 Claims. (Cl. 53—94)

This invention relates to bag making and filling machines useful for example in retail or other stores in packaging food commodities such as vegetables, fruits, potato chips, nuts, sugar and other granulated or pulverulent products, etc., for convenience of storage and/or subsequent carriage.

More specifically, my invention is concerned with machines for producing bags successively from thermo-plastic tubing which may be of "polyethylene," "cellophane" or the like, its chief aim being to provide a machine suitable for this purpose which is simple in construction; which is reliable in operation; and which is adaptable for the formation of bags of different lengths and capacities from tubing of a given diameter, as well as for use in it of tubing of different diameters.

Briefly described, the machine which I have devised for the attainment of these objectives comprises a vertically-arranged axially-hollow holder for supporting a longitudinally-compacted length of the tubing with capacity to be drawn downward as needed for successive bags; a pair of horizontally-arranged opposing reciprocable arcuately bighted crimping elements capable of retraction to allow passage of the tube between them, and adapted upon relative approach at each actuation, to close in upon the tube and circumferentially crimp it and thereby form a short axial constriction; vertically-spaced mold elements associated with the crimping elements for gripping and holding the constriction compressed; and an electrically heated element with means for passing it through the interval between the mold elements to cut across the constriction with attendant fusion and integration of the compressed tube material within the confines of the mold elements, to close a filled bag and at the same time form the bottom of a new bag.

In connection with a bag making and filling machine having the foregoing attributes, it is a further aim of my invention to provide regulatable means whereby the time interval for the active pass of the heated element can be predetermined to insure complete fusion of the compressed tube material of the constriction within the confines of the mold elements.

Other objects and attendant advantages will appear from the following detailed description of the attached drawings, wherein Fig. 1 shows the front elevation of my improved bag forming and filling machine.

Fig. 2 is a side elevation of the machine as seen from the right of Fig. 1.

Fig. 3 is a fragmentary view in vertical section taken as indicated by the angled arrows III—III in Fig. 1, and drawn to a larger scale.

Fig. 4 is a fragmentary view in horizontal section taken as indicated by the angled arrows IV—IV in Figs. 1 and 3.

Fig. 5 is a horizontal section taken as indicated by the angled arrows V—V in Fig. 1 showing the tube crimping elements in substantially closed position.

Fig. 6 is a fragmentary view in vertical section taken as indicated by the angled arrows VI—VI in Fig. 5.

Figs. 7 and 8 are views respectively like Figs. 5 and 6 showing the bag closing elements in fully closed position, and the sealing element in its fully advanced position at the end of a bag closing and sealing cycle of the machine.

Fig. 9 is a fragmentary view in front elevation of the lower part of the machine corresponding to Fig. 1, but with the crimping elements and the sealing element in fully retracted position to clear the tubing.

Fig. 10 is a fragmentary view partly in side elevation and partly in vertical section taken as indicated by the angled arrows X—X in Fig. 9.

Fig. 11 is a horizontal section taken as indicated by the angled arrows XI—XI in Fig. 9.

Fig. 12 is a fragmentary view partly in front elevation and partly in vertical section taken as indicated by the angled arrows XII—XII in Fig. 11.

Figs. 13, 14 and 15, 16 are fragmentary views on an enlarged scale in top plan and in horizontal section showing, to better advantage, the action of the crimping and sealing elements.

Fig. 17 is a transverse fragmentary detail section taken as indicated by the angled arrows XVII—XVII in Fig. 8.

Fig. 18 is a broken out perspective view of one of the crimping elements.

Fig. 19 is a perspective view of certain of the component parts of one of the crimping elements.

Fig. 20 is a detail view in section taken as indicated by the angled arrows XX—XX in Fig. 5.

Fig. 21 is an enlarged detail view looking as indicated by the angled arrows XXI—XXI in Fig. 2, and showing the parts within the area of the broken line rectangle XXI in Fig. 1.

Fig. 22 shows the axial section of a dash pot used as a motion retarding device in the machine.

Figs. 23-27 are diagrammatic views showing successive stages in the operation of the machine.

As herein exemplified, my improved bag filling machine has a skeleton frame 1 of structural iron with a plate 2 (Figs. 3 and 4) mounted over and secured to spaced bars 3 extending crosswise between the front and rear horizontals 4 and 5 at the top of said frame, said plate having a circular central opening with an upstanding circumferential flange 6. The articles or commodities to be packaged are introduced through a hopper 7 whereof the outlet neck 8 fits into the opening of plate 2. Diametral pins 9 on the hopper neck 8 engage, bayonet-lock fashion, into undercut notches 10 in the flange 6 of plate 2 to removably secure the hopper 7 in place. Removably attached to the bottoms of the cross bars 3 in coaxial relation with the opening in plate 2 by means of headed stud and bottom hole means at 11, is an annulus 12 having a pendent flange 13. The thermoplastic tubing T from which the bags are to be formed is slipped over an axially hollow spool-like holder 15 whereof the body is perforated and provided with circumferential flange heads 16 and 17 at its opposite ends. The perforations in the body 15 permit the escape of air trapped between the tubing and the outer surface of the holder. In applying the tubing, it is longitudinally crumpled or compacted on the holder 15 as conventionally indicated at $a$ in Fig. 3. Accordingly, a considerable length of the tubing is available for the making of a great number of bags before replenishment becomes necessary. The loaded tube holder 15 is placed in the machine by engaging its upper end over the pendent flange 13 of plate 12 from beneath and then secured by the clamp levers designated 18. As shown, these levers 18 are fulcrumed about fixed studs 19 on plate 12 and have eccentric cam portions 20 which clampingly engage the top head 16 of the holder 15 at diametrically-opposite points.

Constrained to movement in fixed horizontal guide bars 21 somewhat above the mid-height of the frame 1 are opposingly-arranged bag crimping elements in the form of slides 22 and 23 which, except for being reversely positioned as shown in Fig. 5, are identical in construction. Each slide 22, 23 comprises three blades 24, 25 and 26 in superposed relation, which are rigidly secured centrally of their outer edges to a clevis lug 27 by means of screws 28. It will be observed that the blades 25, 26 are spaced from each other by a relatively narrow interval, and the pair is spaced from the blade 24 by a distance equal to the vertical thickness of the clevis lug 27, the proportioning being such that the blade 24 of one slide fits into the interval between the paired blades 25, 26 of the other slide. The blades 24—26 are exact counterparts of each other and have arcuate bights 29 which extend inwardly of their confronting edges and terminate in relatively narrow notches 29a. The bights 29 are symmetrical in respect to the axis of the holder 15 both longitudinally and transversely of the machine, and are suitably shaped to prevent tearing of the bag material as the slides are moved toward each other to bag-closing position in a manner which will be described later. Permanently secured to the blades 24 are nonmetallic blocks 30 of fiber or other suitable insulation which are equal in width to the notches 29a, and which extend from said notches to the clevis lugs 27; and similarly secured to the blades 25, are blocks 31 of like material which are shaped to extend about the bights 29 in the latter blades, the flanking portions of the last mentioned blocks being bevelled off as indicated at 31a.

The slides 22 and 23 are operable by means of a treadle 35 affixed to a rock shaft 36 in the lower portion of the machine 1, together with a horizontal arm 37. By means of links 38 and 39, the arm 37 is connected to arms 40, 41 respectively fixed on rock shafts 42, 43 which are journalled in inwardly-extending bearing brackets 44, 45 at opposite sides of said frame 1 approximately at the mid-height of the machine. The distal ends of other arms 46, 47 also affixed to the rock shafts 42, 43, are pivotally connected, with interposition of short links 48, 49, to the clevis lugs 27 on the slides 22, 23. Springs 50 and 51 influential upon the linkage connections just described, serve to normally keep the treadle 35 raised with the slides 22, 23 in closed position as in Figs. 1, 7 and 8.

In being drawn off the holder 15 during bag formation, the tubing T is controlled by a pair of rollers 52 which bear upon it at diametrically opposite points at the level of the lower head 17 of said holder. The rollers 52 are supported by spring-urged plunger rods 53 guided for endwise movement in brackets 54, and are restrained by friction brake tongues 55 of which the pressure is adjustable by means of thumb screws 56.

The means which I have devised for sealing the bags and separating them successively from the tube T includes an electrically-heated filament loop 57 which projects from the distal end of an arm 58 on a vertical axis shaft 59 rotatively supported in fixed brackets 60. A spur wheel 61 on shaft 59 meshes with a spur pinion 62 on another vertical axis shaft 63 also rotative in lower bracket 60. Also secured to shaft 63 is a gear wheel 64 which meshes in turn with rack teeth 65 on the position rod 66 of a horizontally-arranged stationarily supported dash pot 67. For a purpose later on explained and as shown in Fig. 20, the gear wheel 64 is provided in its bottom face with an eccentrically disposed hemispherical socket indentation 64a for engagement by the rounded end of a plunger detent 68 which is axially movable in the lower bracket 60 and yieldingly urged upwardly by an adjustable spring 69. As shown in Fig. 22, the piston 70 of the dash pot 67 has ports which are normally closed by a spring-biased disk 71; and a spring 72 coiled about the piston rod 66 and the head of the dash pot cylinder tends to urge said rod leftward. Bleeding of air from the rear end of the cylinder is regulatable by means of the stop cock indicated at 73. The distal end of dash pot piston rod 66 is slidingly guided in the bracket 60, and secured to it in the interval between said bracket and the dash pot 67 is a flanged collar 75. For actuating the dash pot piston rod 70, there is shown a bell crank lever 76 which is fast on a transverse shaft 77 journalled in the frame 1. The upright arm 78 of lever 76 has a rounded cam end 79 for engaging the flanged collar 75 from the left when said lever is moved clockwise. A set screw 80 spaced from the cam end 79 of arm 78 and adjustable in an offset 81 of said arm is adapted to engage the collar 75 from the right when the lever 76 is moved counterclockwise. The other arm 82 of lever 76 is connected, by means of a link 83, to an arm 85 fixed on rock shaft 42. Current flow to the filament loop 57 is controlled by a micro switch 86 which is mounted on one of the rear horizontals of the frame 1 with the end of its actuating finger 87 in the path of the collar 75 on the piston rod 66 of the dash pot cylinder 67. Current for heating the glow loop 57 is supplied from the secondary of a transformer under regulation of a rheostat, the latter two elements being respectively designated 88 and 89 and shown also as being mounted on the frame 1. It is to be understood that, in practice, the switch 86 and the rheostat 89, and a hand switch shown at 90 at the top of the machine, are connected in series with the secondary coil of the transformer 88.

During introduction of the articles into the tube T, the slides 22—23 are fully retracted as in Fig. 11, and by the weight of the articles, the tube is drawn downward off the holder 15 until the bottom end thereof comes to rest on a platform or shelf 91 in the lower part of the machine. Secured medially of the bottom face of platform 91 adjacent the rear edge, is a flexible rod 92 (Fig. 7) whereof the ends project through pendent horizontally-slotted plates 93 at the opposite side edges of the platform. The protruding ends of the rod 92 are selectively engageable with edge notches in two fixed vertically-arranged rack bars 94 within the frame, see Fig. 10. Projecting laterally from the side edges of the platform 91 adjacent its frontal edge are transversely-aligned studs 95 which are selectively engageable into edge notches in the upright legs 96 of a vertically reciprocable U-shaped element 97. As shown, this element 97 has cylindric rod extensions 98, 99 at the top and bottom, slidably engaged respectively in inwardly-reaching guide brackets 100 on the frame 1 and in angle bars 101 extending transversely between front and rear frame horizontals 102 and 103. A yoke-like link 105 pivoted at its upper end to the cross bar 106 of the element 97, connects the latter to the treadle 35.

Operation

In preparation for the operation of the machine, a suitable length of tubing T slid onto the holder 15 until its leading end is stopped against the flange head 16. The material is then completely gathered upon the narrowed body of the holder, and retained thereon through stopping of its opposite end behind the flange head 17. After being so charged, the holder 15 is placed in the machine by engaging its top end upwardly over the pendent flange 13 of annulus 12, whereupon the holder secured by means of the clamp levers 18 as shown in Figs. 3 and 4, and as previously explained. With this preparation, the machine operator depresses treadle 35 to fully retract the crimping elements 22 and 23 as in Figs. 11, 12 and 23. By the partial counterclockwise rotation incidentally imparted to shaft 42, the arm 78 of bell crank 76 is moved rightward from the position of Fig. 3 to the position of Fig. 12 and, through coaction of its cam end 79 with the flanged collar 75, the piston rod 66 is drawn outward of the dash pot cylinder 72, with attendant compression of the spring 72 within the latter and release of the operating finger 87 of switch 86 to permit current flow to the glow loop 57. At the same time, the arm 58 carrying the filament loop 57 is withdrawn to the position in which it is shown in Fig. 11 out of the path of the tubing T, by action of the rack teeth 65 of piston rod 66 upon the gear train 64, 62 and 61. The arm 58 will be cocked in this position through entry of the stud 68 into the depression 64a in the gear wheel 64, as shown in Fig. 20. At this stage, a sufficient length of the tubing T is drawn downward off the holder 15 to bring its free end to a level somewhat below the plane of the crimping elements 22, 23 as shown in Fig. 23. The treadle 35 is then released to allow the crimping elements 22, 23 to close in upon the tube to the extent shown in Fig. 5 and in dash-dot lines in Fig. 24, by the pull of springs 50 and 51 upon the actuating linkage to which said elements are connected. As the elements 22, 23 approach each other, the material of the tubing is crimped circumferentially, after the manner shown in Fig. 13 by the smooth gathering action of the liberal opposing edge curvatures of the bights 29 in the blades 23, 24, 25, into a relatively short constriction of small cross sectional area within the notches 29a of said blades and the now interengaged cooperating wedge blocks 30, 31. At this stage, the arm 58 is still held in the withdrawn position of Fig. 5 by the restraining action of the detent 68 upon the gear wheel 6. The operator now depresses the treadle 107 and so causes the elements 22, 23 to be moved somewhat more toward each other, with the result that the gathered portion of the tube material is more tightly compressed between the notches 29a of the blades 23, 24, 25 and the mold blocks 30, 31 as shown in Figs. 7, 15, 16 and full line position of Fig. 24. By the additional counter clockwise movement incidentally imparted to bell crank lever 76, the screw 80 in the offset 81 of said lever, by engagement with the flanged disk 75 (Fig. 6), causes the piston rod 66 of dash pot 67 to be shifted sufficiently to the left for release of the gear wheel 64 from the detent stud 68 (as indicated by dot-dash lines in Fig. 6). The spring 72 in the dash pot cylinder now takes over to move the piston rod 66 leftward at a rate determined by adjustment of the bleed cock 73 whereby, through the gearing 65, 64, 62 and 61, the arm 58 is slowly swung counterclockwise to the dash and dot line position of Fig. 5 from the full line position of Fig. 7 to pass the filament 57 horizontally through the interval between the closed-vertically spaced mold blocks 30, 31 on the blades of elements 22, 23. In this way, the compressed constriction of the tube material is severed crosswise, and sufficient time is afforded for fusing thereof within the confines of the mold blocks 30, 31. Ordinarily, a time interval of three seconds is found to be adequate for the purpose. The integrated button of the tube material thus formed, hermetically seals the bottom of the tube. Eventually as the piston rod 66 of dash pot 67 completes its leftward stroke, the flanged disk 75 re-engages the actuating member 87 of micro switch 86 to re-open the latter and interrupt current flow to the filament 57. In the meantime the desired number or unit quantity of the commodity or commodities to be packaged are introduced from above into the tube through the feed hopper 7 and the holder 15 as shown in Fig. 24. The operator then again depresses the treadle 35 to fully retract the crimping elements 22, 23 with incidental tilting of the platform 91 as in Fig. 25, whereupon the tube drops under the weight of its contents until its bottom end encounters said platform. Due to the tilt of the platform 91 an additional amount of the bag material is withdrawn from the holder to allow closing of the tube over the contents as about to be explained, the draw-off of excessive material from the holder 15 being prevented by the restraining action of the rollers 52, as will be readily understood from Figs. 1 and 21. The recovery of the tilted platform raises the charged tube, making available for closure purposes this additional bag material. With the tube now charged as in Fig. 25, operator releases the treadle 35 to allow the crimping elements 22, 23 to close upon the tube T over its contents, and immediately thereafter depresses the treadle 107 as in Fig. 26. As a consequence, a new constriction is formed and severed, with incidental separation of a closed top-sealed bag B from the tubing T and formation of a sealed bottom for a succeeding bag. After a new commodity charge is introduced into the tubing during the closed phase of the crimping elements 22, 23 as in Fig. 26, the treadle 35 is again depressed as in Fig. 27 for retraction of said elements as before, so that the tube can descend upon removal of the filled bag B. The foregoing cycle is repeated over and over again until the supply of tubing on the holder 15 is exhausted.

Due to the flexibility of the rod 92 on platform 91, its ends can be selectively engaged in the notches of the rack bars 94 and the studs 95 likewise selectively engaged in the notches of the element 96, to raise or lower the platform and so adapt the machine for making and filling bags of different heights and capacity from tubing of one diameter. Moreover, the machine can be adapted for operation upon tubing of different diameters through use of holders 15 of correspondingly different diameters, and by substituting, for the ring 12 (Figs. 3 and 4), others with flanges to fit such holders.

A modified form of the holder 15 is formed with an oval cross-section and is mounted in the machine with the longitudinal axis of the oval extending longitudinally of the machine whereby the gathering in of the bag material by the blades 24—26 is facilitated. See T' in Fig. 11 which designates tubing mounted on a holder having such an oval cross-section.

Having thus described my invention, I claim:

1. In a bag making machine, two opposing relatively reciprocated crimping elements for laterally contracting intermittently-advanced thermoplastic tubing at lengthwise intervals, said elements having complemental bights and narrow constraining notches centrally of said bights, operative upon relative approach at each actuation, to progressively gather in the material of the tubing circumferentially into a relatively short axial constriction within a small opening jointly formed by the notches at the completion of the inward movement of said elements; and means for sealing the tube material in the constriction while constrained within said opening, spring means for urging the crimping elements toward each other to closed or clamping position; means for imparting additional inward movement to the crimping elements after each closure by the spring means to more tightly compress the constriction; and means for retracting the crimping elements against spring resistance after severance of the constriction by the sealing means.

2. In a bag making machine, two opposing relatively reciprocated crimping elements, each comprising a pair of spaced flat parallel centrally notched bighted blades with a blade of the one overlapping the corresponding blade of the other and with mold blocks similarly notched and secured to the confronting faces of the component blades of each pair, said elements being adapted upon relative approach to progressively gather in the material of intermittently-advanced thermoplastic tubing into a relatively short axial constriction of small diameter, a normally retracted heated element; and means for moving the heated element crosswise of a clearance interval between the mold blocks on the blades of the crimping elements to sever the constriction while clamped in a small opening jointly formed by the notches of said blades and said blocks with incidental fusion and integration of the tube material in said constriction.

3. A bag machine according to claim 2, wherein the blades are of metal and the mold blocks are of insulation; and wherein the cutting and sealing element is electrically heated.

4. In a bag making machine, means for laterally contracting intermittently-advanced thermo-plastic tubing at intervals of its length comprising opposing retractable crimping elements adapted upon relative approach at each actuation, to gather in the material of the tubing circumferentially into a relatively short axial constriction; spring means for urging the crimping elements toward each other to closed or clamping position; means for imparting additional inward movement to the crimping elements after each closure by the spring means, to more tightly compress the constriction; a heated cutting and fusing element; means for moving the cutting and fusing element through a clearance between the crimping elements to sever the constriction with incidental fusion and integration of the tube material within the constriction; and means for retracting the crimping elements against spring resistance after severance of the constriction by the cutting and fusing element.

5. In a bag making machine, means for laterally contracting intermittently-advanced open thermo-plastic tubing at intervals of its length comprising opposing retractable crimping elements adapted upon relative approach at each actuation, to gather in the material of the tubing circumferentially into a relatively short axial constriction; a heated cutting and fusing element; spring means for moving the cutting and fusing element through a clearance between the crimping elements to sever the constriction with incidental fusion and integration of the tube material in the constriction; means operative upon retraction of the crimping elements, to withdraw the cutting and fusing elements against spring resistance out of the way of the tubing; detent means for locking the cutting and fusing element in retracted position; and means operative to release the detent means after the crimping elements have closed in upon the tubing.

6. In a bag making machine, means for laterally contracting intermittently-advanced open thermo-plastic tubing at intervals of its length comprising opposing retractable crimping elements adapted upon relative approach at each actuation, to gather in the material of the tube circumferentially into a relatively short axial constriction; a heated cutting and fusing element; spring means for moving the cutting and fusing element through a clearance between the crimping elements to sever the constriction with incidental fusion and integration of the compressed tube material within the constriction; means operative as the crimping elements are retracted, to withdraw the cutting and fusing element against spring resistance out of the way of the tubing; detent means for locking the cutting and fusing element in retracted position; means operative to release the detent means after the crimping elements have closed in upon the tube; and regulatable means for controlling the spring means to determine a definite time interval for passage of the cutting and fusing element through the constriction.

7. In a bag making machine, means for laterally contracting intermittently-advanced open thermo-plastic tubing at intervals of its length comprising opposing retractable crimping elements adapted upon relative approach at each actuation, to gather in the material of the tube circumferentially into a relatively short axial constriction; an electrically heated cutting and fusing element; means for moving the cutting and fusing element through a clearance between the crimping elements to sever the constriction with incidental fusion and integration of the compressed tube material within the constriction; a normally open switch in circuit with the cutting and fusing element; and means automatically operative as the cutting and fusing element begins its cutting movement, to close the switch, and to open the switch during the retractive movement of said element.

8. In a bag making machine, means for laterally contracting intermittently-advanced open thermo-plastic tubing at intervals of its length comprising opposing retractable crimping elements adapted upon relative approach at each actuation, to gather in the material of the tube circumferentially into a relatively short axial constriction; an electrically heated cutting and fusing element; spring means for moving the cutting and fusing element through a clearance between the crimping elements to sever the constriction with incidental fusion and integration of the tube material in the constriction; a normally open switch in circuit with the cutting and fusing element; means operative as the crimping elements are retracted, to withdraw the cutting and fusing element against spring resistance out of the way of the tubing; detent means for locking the cutting and fusing element in retracted position, means operative after the crimping elements have closed in upon the tube to trip the detent and thereby allow advance of the cutting and fusing element by the spring means; regulatable means for controlling the spring means to determine a definite time interval for passage of the cutting and fusing element through the constriction; and means automatically operative to close the switch as the cutting and fusing element begins its cutting movement, and to open the switch during the retractive movement of said element.

9. In a bag making and filling machine, a vertically-arranged axially-hollow holder for supporting a length of longitudinally-compacted thermo-plastic tubing with capacity to be drawn downward as needed for successive bags; a pair of horizontally-arranged opposing radially-reciprocable bighted crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with means for passing it through a clearance between the crimping elements to sever the constriction transversely, with attendant fusion and integration of the compressed tube material within the confines of the constriction, thereby to close and seal a previously filled bag and at the same time form the bottom of a new bag; a platform at a level below the crimping elements to stop the tubing in its descent upon retraction of the crimping elements as articles to be packaged are introduced into the tube from above through the holder; spring means for moving the crimping elements to closed or clamping position; and a treadle with interposed linkage means for retracting said elements against spring resistance to clear the tubing after severance of a constriction.

10. In a bag making and filling machine, a vertically-arranged axially-hollow holder for supporting a length of longitudinally-compacted thermo-plastic tubing with capacity to be drawn downward as needed for successive bags; a pair of horizontally-arranged opposing radially-reciprocable bighted crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with means for passing it through a clearance between the crimping elements to sever the constriction transversely, with attendant fusion and integration of the compressed tube material within the confines of the constriction; thereby to close and seal a previously filled bag and at the same time form the bottom of a new bag; a platform at a level below the crimping elements to stop the tubing in its descent upon retraction of the crimping elements as articles to be packaged are introduced into the tube from above through the holder; spring means for moving the crimping elements to closed or clamping position; means for thereafter imparting additional inward movement to the crimping elements to more tightly compress the constriction during the pass of the cutting and fusing element; and means for retracting the crimping elements against spring resistance to clear the tubing after severance of the constriction.

11. In a bag making and filling machine, a vertically-arranged axially-hollow holder for supporting a length of longitudinally-compacted thermo-plastic tubing with capacity to be drawn downward as needed for successive bags; a pair of horizontally-arranged opposing radially-reciprocable bighted crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with means for passing it through a clearance between the crimping elements to sever the constriction transversely, with attendant fusion and integration of the compressed tube material within the constriction, thereby to close and seal a previously filled bag and at the same time form the bottom of a new bag; a platform at a level below the crimping elements to stop the tubing in its descent upon retraction of the crimping elements as articles to be packaged are introduced into the tube from above through the holder; spring means for urging the crimping elements toward each other into closed or clamping relation; a treadle with interposed linkage connections for imparting additional inward movement to the crimping elements to more tightly compress the constriction during the pass of the cutting and fusing elements; and a second treadle for reversely actuating the linkage means to retract the crimping elements against the spring resistance to clear the tubing after severance of the constriction.

12. In a bag making and filling machine, a vertically-arranged axially-hollow holder for supporting a length of longitudinally-compacted thermoplastic tubing with capacity to be drawn downward as needed for successive bags; a pair of horizontally-arranged opposing radially-reciprocable bighted crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with spring means for passing it through a clearance between the mold elements to sever the constriction transversely with attendant fusion and integration of the compressed tube material within the confines of the constriction, thereby to close and seal a previously filled bag and at the same time form the bottom of a new bag; a platform at a level below the crimping elements to stop the tubing in its descent upon retraction of the crimping elements as articles to be packaged are introduced into the tube from above through the holder; means operative as the crimping elements are retracted to withdraw the cutting and fusing element against the spring resistance out of the path of the tubing; detent means for locking the cutting and fusing element in retracted position; and means operative to release the detent means after the crimping elements have closed in upon the tubing.

13. In a bag making and filling machine, a vertically-arranged axially-hollow holder for supporting a length of longitudinally-compacted thermoplastic tubing with capacity to be drawn downward as needed for successive bags; a pair of horizontally-arranged opposing radially-reciprocable bighted crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with spring means for passing it through a clearance between the mold elements to sever the constriction transversely, with attendant fusion and integration of the compressed tube material within the confines of the constriction, thereby to close and seal a previously filled bag and at the same time form the bottom of a new bag; a platform at a level below the crimping elements to stop the tubing in its descent upon retraction of said elements as articles to be packaged are introduced into the tube from above through the holder; means operative as the crimping elements are retracted to withdraw the cutting and fusing element against the spring resistance out of the path of the tubing; detent means for locking the cutting and fusing element in retracted position; means operative to release the detent means after the crimping elements have closed in upon the tubing; and regulatable means for controlling the spring means to predetermine a definite time interval for passage of the cutting and fusing element through the constriction.

14. In a bag making and filling machine, a vertically-arranged axially-hollow holder for supporting a length of longitudinally-compacted thermo-plastic tubing with capacity to be drawn downward as needed for successive bags; a pair of horizontally-arranged opposing radially-reciprocable crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; an electrically heated element with means for passing it through a clearance between the mold elements to sever the constriction transversely, with attendant fusion and integration of the compressed tube material within the confines of the constriction, thereby to close and seal a previously filled bag and at the same time form the bottom of a new bag; a platform at a level below the crimping elements to stop the tubing in its descent upon retraction of said elements as articles to be packaged are introduced into the tube from above through the holder; a normally open switch in circuit with the cutting and fusing element; and means automatically operative as said element begins its cutting movement, to close the switch, and to re-open the switch during retraction of said element.

15. In a bag making and filling machine, a vertically-arranged axially-hollow holder for supporting a length of longitudinally-compacted thermo-plastic tubing with capacity to be drawn downward as needed for successive bags; a pair of horizontally-arranged opposing radially-reciprocable crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; an electrically heated element with spring means for passing it through a clearance between the mold elements to sever the constriction transversely with attendant fusion and integration of the compressed tube material within the confines of the constriction, thereby to close and seal a previously filled bag and at the same time form the bottom of a new bag; a platform at a level below the crimping elements to stop the tubing in its descent upon retraction of said elements as articles to be packaged are introduced into the tube from above through the holder; a normally open switch in circuit with the cutting and fusing element; means operative as the crimping elements are retracted to withdraw the cutting and fusing element against spring resistance out of the way of the tubing; detent means for locking the cutting and fusing element in retracted position; means operative after the crimping elements have closed in upon the tubing to release the detent means and thereby allow advance of the cutting and fusing element by the spring means; regulatable means for determining a definite time interval for passage of the cutting and fusing element through the constriction; and means automatically operative to close the switch as the cutting and fusing element begins its cutting movement, and for opening the switch during the retractive movement of said element.

16. In a bag making and filling machine, a vertically-arranged axially-hollow holder for supporting a length of longitudinally-compacted thermo-plastic tubing with capacity to be drawn downward as needed for successive bags, said holder being perforated to permit escape of air trapped between its outer surface and the tubing;

a pair of horizontally-arranged opposing radially-reciprocable crimping elements at a level below the holder capable of retraction to allow passage of the tube between them, and adapted upon relative approach at each actuation, to close in upon the tubing and circumferentially crimp it progressively for the formation of a relatively short rounded axial constriction of small diameter; a heated element with means for passing it through the interval between the mold elements to sever the constriction transversely, with attendant fusion and integration of the compressed tube material within the confines of the constriction, thereby to close and seal a previously filled bag and at the same time form the bottom of a new bag, and a platform at a level below the crimping elements to stop the tubing in its descent upon retraction of said elements as articles to be packaged are introduced into the tube from above through the holder.

JOHN P. GRADY.

References Cited in the file of this patent

UNITED STATES PATENTS

| Number | Name | Date |
| --- | --- | --- |
| 1,686,787 | Bates | Oct. 9, 1928 |
| 1,726,060 | Doble | Aug. 27, 1929 |
| 2,001,074 | Stout et al. | May 14, 1935 |
| 2,232,640 | Schwartzman | Feb. 18, 1941 |
| 2,257,463 | Goodwyn | Sept. 30, 1941 |
| 2,265,253 | Smith | Dec. 9, 1941 |
| 2,292,231 | Lesavoy | Aug. 4, 1942 |
| 2,425,581 | Vincent | Aug. 12, 1947 |
| 2,469,366 | Burbank | May 10, 1949 |
| 2,486,758 | Pfeiffer | Nov. 1, 1949 |